2,878,258
PROCESS OF WORKING UP WATER-SOLUBLE CARBONYLATION PRODUCTS

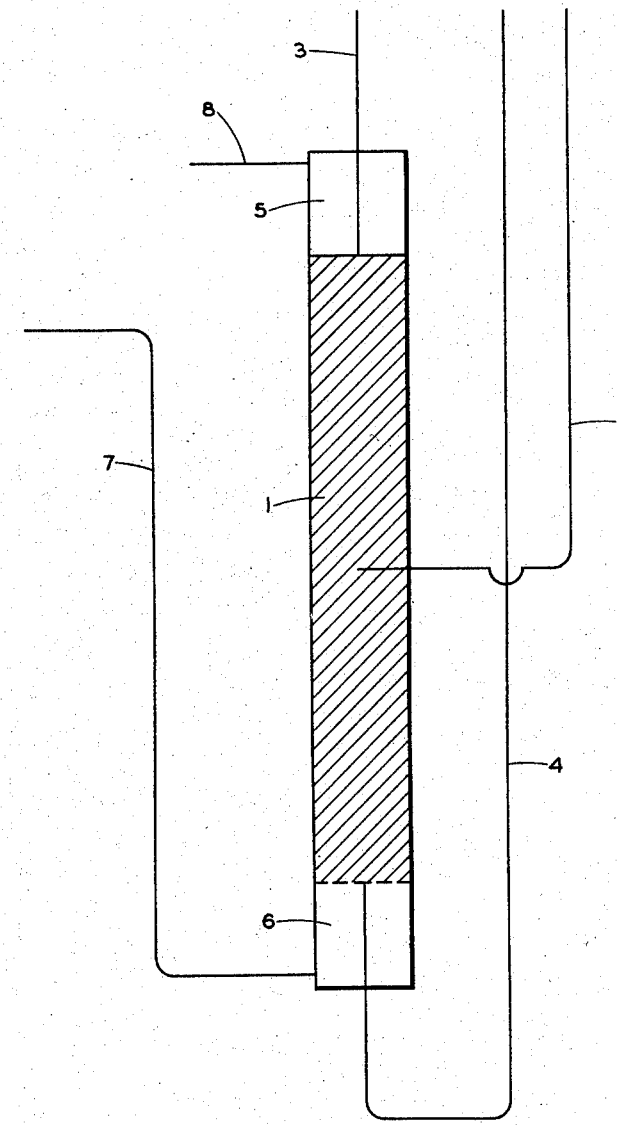

Hans Joachim Pistor and Walter Koelsch, Ludwigshafen (Rhine), Germany, assignors to Badische Anilin- & Soda-Fabrik Aktiengesellschaft, Ludwigshafen (Rhine), Germany Application December 21, 1955, Serial No. 554,521

Claims priority, application Germany December 30, 1954

4 Claims. (Cl. 260—540)

This invention relates to a process for the working up of water-soluble carbonylation products which contain nickel or cobalt catalysts in dissolved form.

The crude products formed in carbonylation processes in the presence of nickel or cobalt catalysts, which as a rule contain, besides the water-soluble carbonylation products, water, water-soluble nickel or cobalt salts and organic contaminants, can only be worked up with difficulty by the usual distillation. The catalyst constituents remaining in the distillation residue are in a form which renders their re-use difficult. The separation of the water-insoluble organic by-products from the carbonylation products also offers difficulty.

For these reasons it has already been proposed to recover the water-soluble crude products obtained by carbonylation in pure form by the aid of extraction agents. While it is true that this method leads to good results, it renders necessary the use of considerable amounts of extraction agents.

We have now found that the disadvantages of both of the said methods are avoided by separating by distillation the reaction mixture obtained by a carbonylation process with the use of a nickel or cobalt catalyst into a first runnings containing only a small amount of carbonylation product, a main fraction consisting of practically pure carbonylation product, and a residue which is still a clear solution, and subjecting the first runnings together with the residue to extraction with (a) an organic solvent which is immiscible with water and has a bad solvent power for the carbonylation product and (b) water, the two solvents (a) and (b) being led in countercurrent to each other. The first runnings are withdrawn from the head of the column, the distillation being conducted so that it contains as little as possible of the carbonylation product. The main fraction, which consists to the extent of 99% or more of the carbonylation product, is preferably withdrawn at a point of the distillation column lying below the head of the column. It is cut off so that the residue remaining in the distillation column is a homogeneous clear solution which preferably amounts to at least 3% of crude carbonylation mixture to be separated. The residue contains organic by-products of high boiling point as well as some carbonylation product and the nickel or cobalt compounds dissolved in water.

For the counter-current extraction serving for the further separation of the first runnings and the distillation residue, there are used as extraction agents on the one hand water and on the other hand an organic solvent which has a very slight solubility in water and does not take up appreciable amounts of the carbonylation product. The organic solvent should furthermore have so low a boiling point that it can easily be separated by distillation from the absorbed substances. The extraction is carried out at room temperature or at a little higher temperature, and preferably continuously.

Suitable organic extraction agents are for example liquid hydrocarbons, in particular those which have a boiling point considerably lower than that of the carbonylation product, as for example saturated aliphatic hydrocarbons or benzene or its homologues, or cyclic hydrocarbons, such as cyclohexane. They are preferably led in circulation during the extraction. In many cases, however, circulation can be dispensed with because only relatively small amounts of the organic solvent, at the most 20% by weight relating to the mixture to be extracted, are required.

A suitable embodiment of the process according to this invention will now be described with reference to the accompanying diagrammatic drawing:

The crude carbonylation product to be worked up is separated in a distillation column (not shown) into first runnings, a main fraction and a residue. The first runnings and residue are supplied to an extraction column 1 through a pipe 2. The specifically heavier of the two solvents, as a rule the water, is supplied through pipe 3. The specifically lighter solvent is introduced at the bottom through a pipe 4.

The extraction column 1 is filled with filler bodies to distribute the liquids. Quiescent chambers are provided at the upper (5) and lower (6) ends of the column 1. The two solvents flow in countercurrent to each other through the column 1. There is thereby formed a phase separating surface which is preferably moved into the lower quiescent chamber 6 so that the column 1 is filled with organic solvent, whereas the water is present in dispersed form down to the phase separating surface. It is, however, also possible to conduct the extraction with the column filled with water up to the upper quiescent zone 5.

The nickel and cobalt compounds pass entirely into the aqueous phase and the carbonylation product passes into the aqueous phase to the extent of about 95 to 99%. This leaves the extraction column 1 through a pipe 7. The organic solvent which is laden with the water-insoluble organic by-products leaves the extraction column 1 through a pipe 8. The amount of water is preferably regulated so that the aqueous phase has the desired concentration of catalyst after leaving the column 1. A separation of the carbonylation product from this aqueous catalyst solution is not necessary, and it is even advantageous if the return catalyst solution contains a small amount of carbonylation product because in this way the total yield of carbonylation product is improved.

The process has the advantage that the working up of the fraction of the reaction mixture which, besides carbonylation product, contains water and catalyst can be carried out with relatively small amounts of an organic solvent in a small extraction plant.

The following example will further illustrate this invention but the invention is not restricted to this example. The parts are parts by weight.

Example

A carbonylation product containing mainly crude propionic acid, which has been obtained in the presence of a nickel catalyst, is split up in a distillation column into first runnings withdrawn at the head of the column, a main fraction which consists of practically pure propionic acid, and a distillation residue which is a homogeneous clear solution. The first runnings contain 23% of propionic acid and the residue contains 91% of propionic acid and 7.8% of nickel. The first runnings and the residue together contain about 5% of the total amount of propionic acid formed.

500 parts of residue and 100 parts of first runnings are introduced per hour through the pipe 2 (in the drawing) into the extraction column 1. At the same time 4000 parts per hour of water are introduced into the extraction column 1 through the pipe 3 and 100 parts of octane per hour through the pipe 4. 4300 parts per hour of aqueous solution containing 10.9% of propionic acid and 0.9% of nickel leave the column 1 through the pipe 7. Through the pipe 8, 90 parts of octane with a content of 2.2% of propionic acid are withdrawn per hour.

The aqueous phase leaving the extraction column contains about 98% of the propionic acid contained in the first runnings and residue and 99% of the amount of nickel used. It can be used again directly as catalyst solution for the propionic acid synthesis.

What we claim is:

1. A process of separating a reaction mixture, resulting from the carbonylation manufacture of propionic acid, said mixture containing the reaction catalysts dissolved therein, said catalysts being selected from the group consisting of nickel and cobalt catalysts, which comprises; distilling said reaction mixture to obtain (a) a head fraction containing but a small amount of propionic acid, (b) a main fraction consisting of the practically pure propionic acid and (c) a distillation residue which is a clear solution; mixing the head fraction and the residue; and subjecting said mixture of (a) and (c) to extraction with (1) a liquid hydrocarbon having a boiling point lower than that of the propionic acid and (2) water, the two extracting solvents being moved countercurrently.

2. The process in accordance with claim 1, wherein the head fraction is withdrawn at the head of the distillation column and the main fraction at a point below said head.

3. The process in accordance with claim 1, wherein the liquid hydrocarbon is circulated during the extraction.

4. The process in accordance with claim 1, wherein the liquid hydrocarbon is octane.

References Cited in the file of this patent

UNITED STATES PATENTS

| | | |
|---|---|---|
| 2,327,779 | Fisher et al. | Aug. 24, 1943 |
| 2,448,368 | Gresham et al. | Aug. 31, 1948 |
| 2,593,440 | Hagemeyer | Apr. 22, 1952 |
| 2,658,075 | Reppe et al. | Nov. 3, 1953 |
| 2,739,169 | Hagemeyer | Mar. 20, 1956 |